United States Patent [19]

Anderson et al.

[11] Patent Number: 4,474,133

[45] Date of Patent: Oct. 2, 1984

[54] AIRCRAFT WARNING MARKER

[75] Inventors: Daniel E. Anderson; Riber Marlyk, both of Vancouver, Canada

[73] Assignee: Patton & Cooke, Ltd., Vancouver, Canada

[21] Appl. No.: 301,485

[22] Filed: Sep. 14, 1981

[51] Int. Cl.³ .......................................... H02G 15/00
[52] U.S. Cl. ............................ 116/209; 116/DIG. 33
[58] Field of Search .............. 116/DIG. 33, 209, 200; 174/127, 40 R, 140 CR

[56] References Cited

U.S. PATENT DOCUMENTS

| | | | |
|---|---|---|---|
| 2,427,883 | 9/1947 | Score et al. | 174/40 |
| 3,135,236 | 6/1964 | Pfeiffer | 116/209 |
| 3,183,883 | 5/1965 | Ruhlman | 116/209 |
| 3,253,571 | 5/1966 | Williams | 116/209 |
| 3,270,123 | 8/1966 | Short | 174/127 |
| 3,362,377 | 1/1968 | Hill | 116/209 |
| 3,773,967 | 11/1973 | Sturm | 174/127 |
| 3,825,671 | 7/1974 | Pokorny | 174/40 |
| 3,828,116 | 8/1974 | Lonow | 174/127 |
| 4,071,124 | 1/1978 | Price | 244/33 |
| 4,077,588 | 3/1978 | Hurst | 244/31 |

Primary Examiner—Charles Frankfort
Assistant Examiner—Denis E. Corr
Attorney, Agent, or Firm—Townsend and Townsend

[57] ABSTRACT

An aircraft warning marker for use on a suspended high voltage wire is provided. The marker is composed of a substantially smooth, continuous electrically insulating body and a substantially electrically continuous electrically conducting layer disposed adjacent substantially the entire outer surface of the electrically insulating body. The insulating body and the conducting layer have a sufficiently low combined weight so that the marker is supportable on the wire. The electrically conducting layer of the marker is intended to be electrically connected to the wire.

10 Claims, 5 Drawing Figures

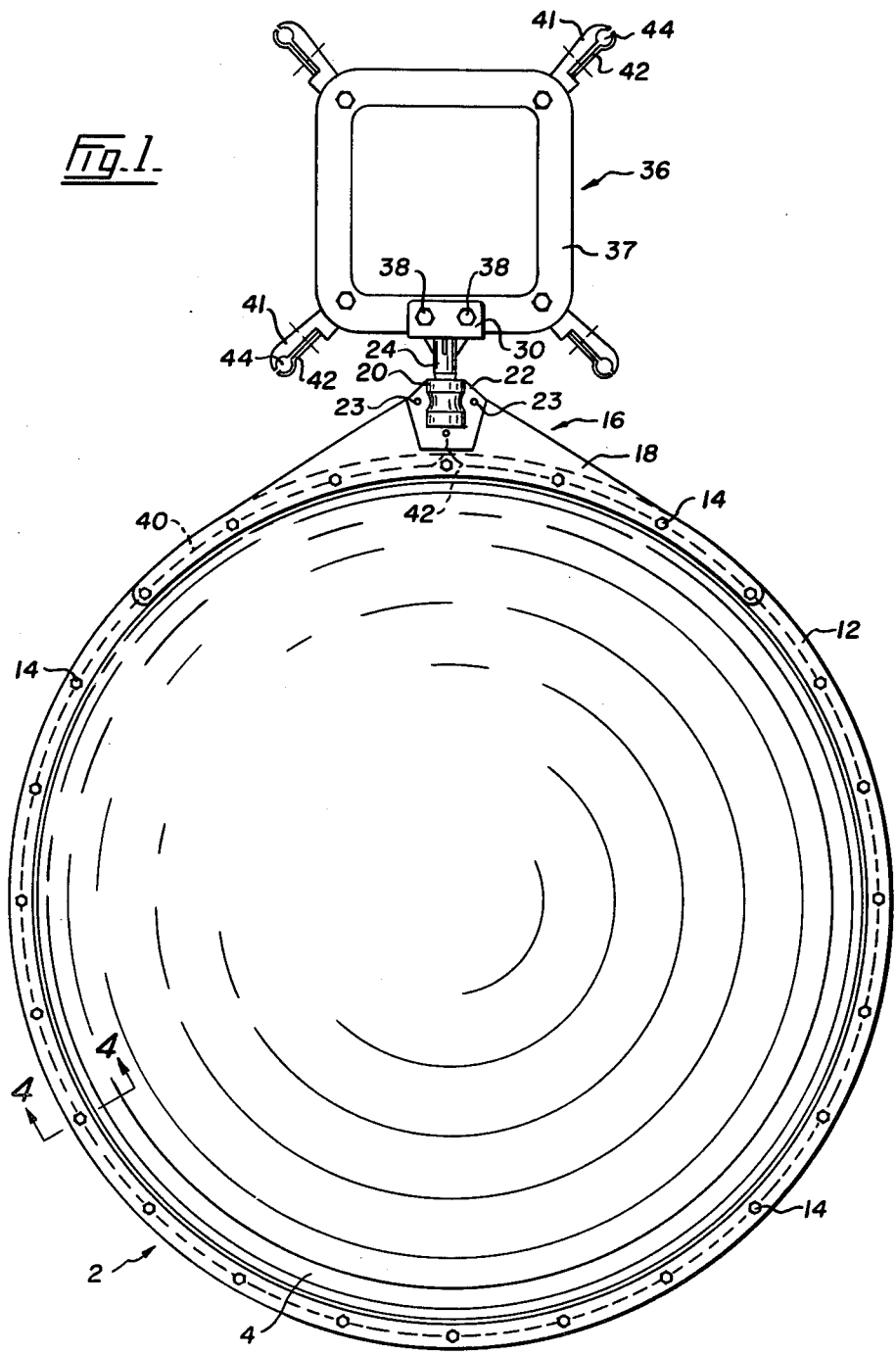

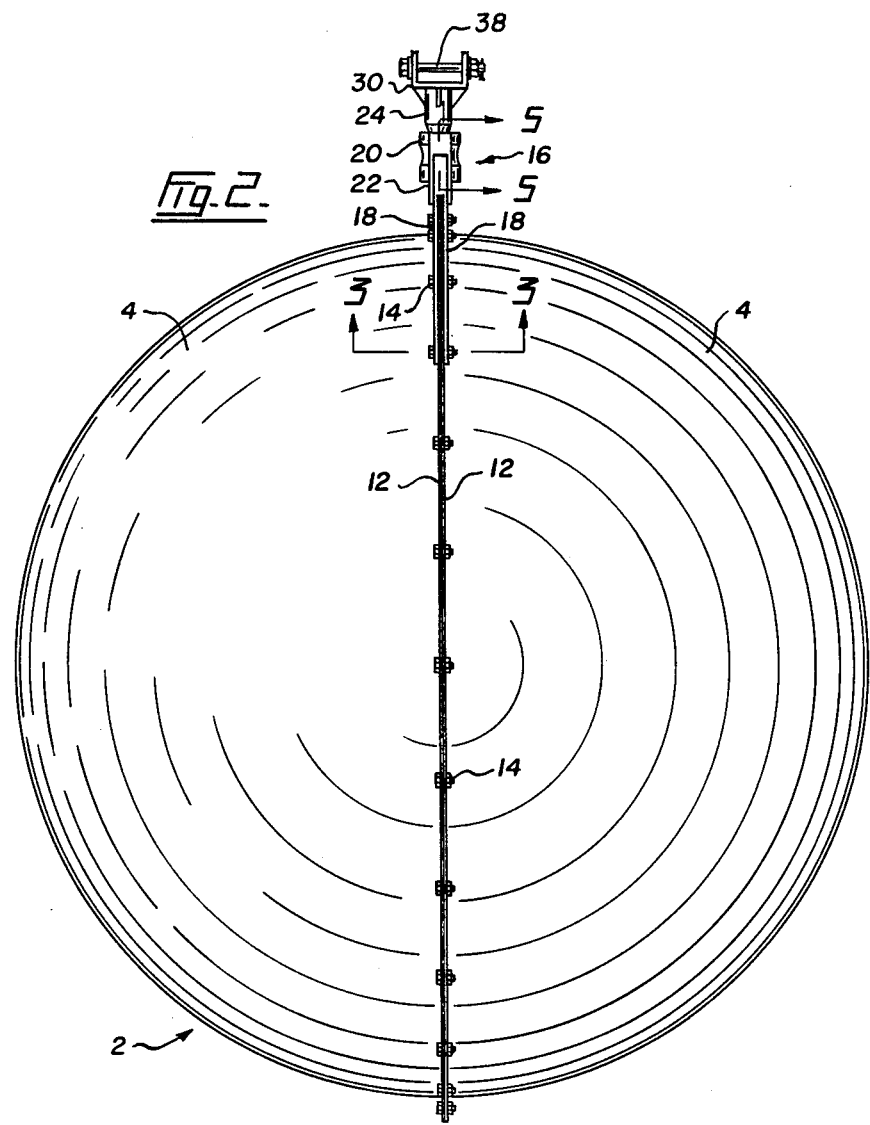

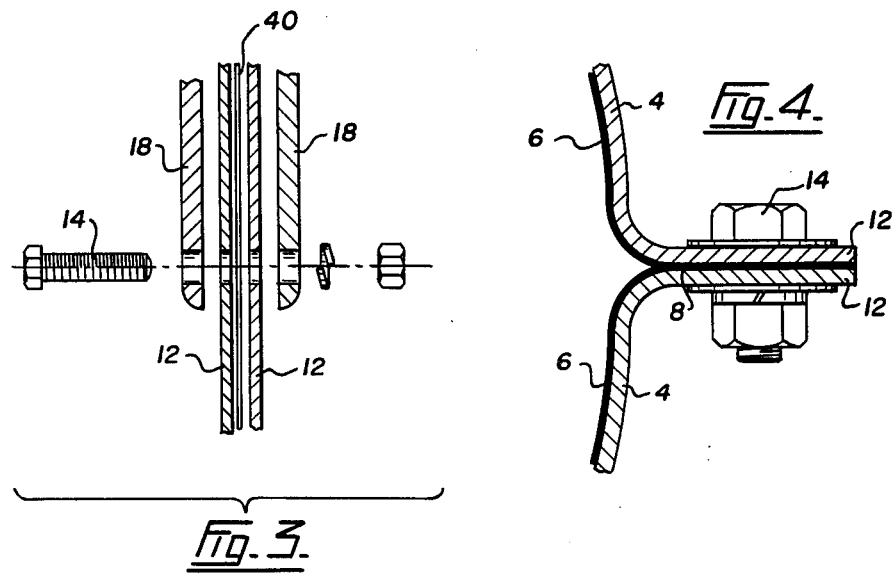
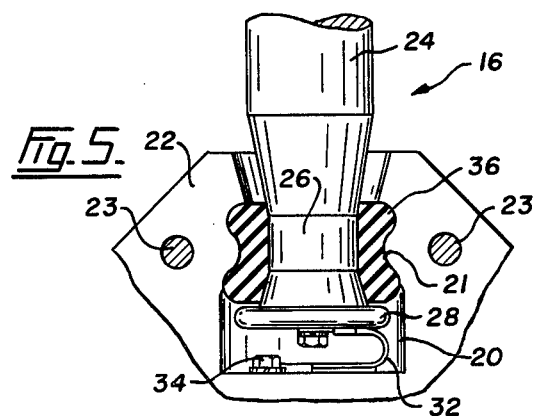

1

AIRCRAFT WARNING MARKER

FIELD OF THE INVENTION

The present invention relates to an aircraft warning marker for use on a suspended high voltage wire.

BACKGROUND OF THE INVENTION

Various devices have in the past been used to visually indicate the presence of suspended cables, and in particular suspended high voltage wires. The devices used in the past on high voltage wires have been of various shapes such as spherical, substantially conical, or of shapes such as those disclosed in U.S. Pat. No. 3,253,571 issued to Williams. Typically, such devices have been made of plastics such as fibreglass although they can be made of sheet metal as in indicated in the Williams patent. These prior devices were either directly connected to the high voltage wire, such as those disclosed in the Williams patent and U.S. Pat. No. 3,662,377 to Helm, or suspended from the high voltage wire by means of a suspension apparatus such as that disclosed in U.S. Pat. No. 3,135,236 to Pfeiffer et al. The suspension apparatus is usually made of metal. The disadvantage of these earlier markers is that when they were made from a nonconducting material such as fibreglass or other plastic, they suffered from a corona discharge from either the high voltage wire itself, when the marker was mounted directly on the wire, or from the usually metallic suspension apparatus when the marker was suspended from the high voltage wire by means of such an apparatus. Of course, even if a sufficiently strong nonconducting suspension apparatus could be used, a corona discharge could occur from the high voltage wire into the suspension apparatus itself. Over a period of time, the corona discharge would eventually destroy the plastic material from which the marker was made, as well as cause other side effects such as radio and television interference. As corona discharge is a phenomena which is directly dependent upon voltage gradient, the severity of the corona discharge problem increases with voltage for a conductor of given shape, and increases with the presence of sharp points or edges on a conductor attached to a source of given voltage. On high voltage wires with voltages in the order of 500 thousand to 1 million volts, the corona discharge problem becomes particularly severe.

Where metallic markers of a shape such as the sheet metal markers described in the patent to Williams are used, corona discharge still presents a problem as a result of the presence of sharp edges. Such sheet metal markers if they are to be of appreciable size would also be unduly heavy and thereby cause an unacceptable mechanical strain on the high voltage wire. As well, markers such as those disclosed in the patent to Williams, due to the method by which the marker is directly attached to the high voltage wire, tend to cause further strain on that wire by prohibiting the natural mechanical oscillations of the wire. In addition, such markers made of sheet metal are not sufficiently flexible so as to withstand mechanical stress resulting from transmission line mechanical oscillations.

It is desirable to provide a marker for use on a suspended high voltage wire which is both electrically conductive so as to substantially eliminate a corona discharge problem and yet which is sufficiently light so as to be supportable on the wire without causing undue strain on it, and which marker will not be affected by mechanical oscillations of the high voltage wire.

SUMMARY OF THE INVENTION

According to the invention there is provided an aircraft warning marker for use on a suspended high voltage wire. The aircraft warning marker comprises a substantially smooth, continuous electrically insulating body, having a length and width both of at least one foot, and a substantially electrically continuous electrically conducting layer disposed adjacent substantially the entire outer surface of the electrically insulating body. The marker further comprises a clamp electrically connected to the electrically conducting layer so as to enable the marker to be suspended from a high voltage wire by the clamp with the electrically conducting layer of the marker in electrical communication with the high voltage wire. By the clamp "enabling" the marker to be suspended from the high voltage wire in the foregoing manner, does not necessarily mean that the clamp is directly attached to the high voltage wire, but can be attached thereto through other intermediary devices. The insulating body, conducting layer, and clamp having a sufficiently low combined weight so that the warning marker is supportable on the wire.

Preferably, the insulating body of the aircraft warning marker is comprised of fibreglass, and the conducting layer is comprised of metalized fibreglass molding cloth disposed within the fibreglass.

The aircraft warning marker may advantageously be comprised of two adjacent sections each having a flanged edge which is connected to the flanged edge of the other insulating body section. The conducting layer in such an arrangement is in the form of a plurality of sections a portion of each of which extends between the flanged edges, and additionally comprises electrically conducting means extending between the flanged edges for electrically connecting the conducting layer sections. Again, the insulating body of the aircraft warning marker is preferably comprised of fibreglass while the conducting layer is preferably comprised of metalized fibreglass molding cloth disposed within the fibreglass.

The preferable shape of the insulating body, is a hollow, substantially spherical shell. The shell may usefully be comprised of two substantially semi-spherical sections each having a circular radially extending flanged edge which flanged edge is connected to the flanged edge of the other semi-spherical section. As well, the metalized fibreglass molding cloth is usefully comprised of a plurality of sections each having a portion extending between the flanged edges. An electrically conducting means extending between the flanged edges for electrically connecting the metalized fibreglass molding cloth sections, may be provided.

Advantageously, the flanged edges of the aircraft warning marker are connected by means of bolts passing therethrough, and the electrically conducting means of the aircraft warning marker may comprise a wire a portion of which is wound on the bolts so as to assist in retaining the wire between the flanged edges. Preferably, the combined thickness of said insulating body and said conducting layer is between 5 to 11 millimeters, and the diameter of said insulating body is substantially 1 to 1.5 meters.

BRIEF DESCRIPTION OF THE DRAWINGS

FIG. 1 is a side view of an embodiment of the invention showing it attached to a suspension apparatus for suspending the invention from a four conductor bundle high voltage wire, FIG. 2 is a side view of the embodiment of FIG. 1 taken 90° from the view of that Figure but with part of the suspension apparatus removed, FIG. 3 is an enlarged cross section taken along the line 3—3 of FIG. 2, FIG. 4 is an enlarged cross section taken along the line 4—4 of FIG. 1, and FIG. 5 is a cross section taken along the line 5—5 of FIG. 2.

DESCRIPTION OF THE PREFERRED EMBODIMENTS

The aircraft warning marker of FIG. 1 has a substantially spherical insulating body 2 made of fibreglass, which insulating body 2 is constructed from two substantially semi-spherical sections 4 each having the circular, radially extending flanged edge 12. The flanged edge 12 of a section 4 is connected to the flanged edge 12 of the other section 4 by means of bolts 14 which pass through the flanged edges 12 of each section 4. Each of the bolts 14 has an associated lock washer and nut. A plurality of sections of aluminized fibreglass molding cloth 6 are disposed within the fibreglass of the insulating body 2 immediately adjacent the entire inside surface of the insulating body 4. Due to the relatively thin insulating body 2, the sections of the aluminized fibreglass molding cloth can be said to be disposed adjacent the entire outer surface of the insulating body 2 also. Although the sections of the aluminized fibreglass molding cloth 6 are disposed adjacent the inside surface of the insulating body 2, they are also disposed within the fibreglass of the insulating body 2, in that the fibreglass will have become absorbed on the sections of the aluminized fibreglass molding cloth 6.

The diameter of the marker is determined by the required degree of visibility and must be compatible with the strain handling capabilities of the high voltage wire from which the marker is to be suspended. A diameter of between 1 to 1.5 meters is suitable for most situations, in which case the combined thickness of the insulating body 2 and the aluminized fibreglass molding cloth will both be 5-10 millimeters.

Each section of the aluminized fibreglass molding cloth 6 may be of virtually any shape. The particular shape is determined by usual fibreglass molding technique considerations. However, within the embodiment of FIG. 1 such sections will usually have a pie-shaped configuration when laid flat. A portion 8 of each of the sections of the aluminized fibreglass molding cloth 6, extends between the flanged edges 12. A wire 40 extends around the entire circumference of the insulating body 2 between the flanged edges 12. A portion of the wire 40 is wound on each of the bolts 14.

The marker of this embodiment may be suspended from a high voltage wire by use of a suspension apparatus having a clamp generally designated 16. The clamp 16 is composed of two half-sections each having a substantially semi-cylindrical portion which, when the two half-sections of the clamp 16 are fastened together, forms the substantially cylindrical portion 20. Each half-section of the clamp 16 also has extending from its semi-cylindrical portion a flange 22 which may be integral with or fastened to an ear 18. Each of the ears 18 are adapted to extend in either direction from the flange 22 along a flanged edge 12 of a section 4 of the insulating body 2, and have holes therein which are adapted to accommodate some of the bolts 14 which also pass through the flanged edges 12. An arm assembly 24 which is used in conjunction with clamp 16 has a narrow end 26 with a lip 28 located thereon, and a rubber bushing 36 located on the narrow end 26, which rubber bushing 36 is adapted to fit within a seat 21 of the substantially cylindrical portion 20. A bracket 30 of the arm assembly 24 is dimensioned to be bolted by bolts 38 to one side of a four conductor spacer-damper 36 generally designated 36. The four conductor spacer damper 36 which is in common use, is used generally merely to space apart the four individual conductors of a four conductor bundle high voltage wire, and to dampen vortex-induced (aeolian) mechanical oscillations in the conductors. The four conductor spacer-damper 36 has a substantially rectangular frame 37 with a support arm 41 extending outward form each corner thereof. The support arm has attached to it a clamp arm 42 which can be swung out form support arm 40 and which is dimensioned to clamp in space 44 a substantially cylindrical electrically conducting rubber bushing (not shown) through which passes longitudinally one conductor of a four conductor bundle high voltage wire. The clamp arm 42 can be held closed against support arm 41 by means of bolts (not shown) or similar means.

Other than the rubber bushing 36, the remainder of the suspension apparatus is made of metal, or in the case of rubber bushings to be fitted in spaces 44, of electrically conducting rubber. Therefore, by connecting the ends 42 of the wire 40 to a bolt 34 disposed in clamp 16, and by connecting a jumper wire 32 between the narrow end 26 of the arm assembly 24 and the bolt 34, the aluminized fibreglass molding cloth 6 is placed at the same electrical potential as the high voltage wire from which it is suspended.

When the marker of this embodiment is suspended from a high voltage wire by means of the clamp 16 and the arm assembly 24, the two half sections of the clamp 16 are bolted together through bolts 23 and the bushing 36 attached to the narrow end 26 of the arm assembly 24, is seated in the seat 21 of the substantially cylindrical portion 20. Each of the ears 18 are each positioned adjacent a flanged edge 12 so that the ears 18 sandwich the two flanged edges 12 between the ears 18. Some of the bolts 14 pass through the ears 18 as well as through the flanged edges 12. Bracket 30 is bolted through bolts 38 to the frame 37 of the four conductor spacer-damper 36. Each of the substantially cyclindrical conducting rubber bushings which are affixed to each of the four conductors of the four conductor bundle high voltage wire, is clamped within space 44 by means of a clamping arm 42 and clamp support arm 41.

The marker itself is prepared from fibreglass resin and aluminized fibreglass molding cloth by means of well known fibreglass molding techniques, each half of the substantially semi-spherical fibreglass sections 4 with its attached section of aluminized fibreglass molding cloth 6, being prepared separately. However, care must be used to ensure that a portion 8 of each section of aluminized fibreglass molding cloth 6 does not become coated with fibreglass resin. This is necessry to ensure that there will be good electrical connection between the sections of aluminized fibreglass molding cloth 6, either by mechanical contact with its adjacent sections or by mechanical contact with the wire 40. Bolts 14 can then be inserted through a flange 12 of one fibreglass section 4, and a portion of the wire 40 may then be wound around each of the bolts 14 in turn, while extending between bolts 14 along the flanged edge 12. Ends 42 of the wire 40 may be left loose for connection to the high voltage wire. The other fibreglass section 4 may then be positioned so that the bolts 14 pass through its flanged edge 12 also.

A nut and its associated lock washer is then tightened on each of the bolts 14, with each of the bolts 14 being held stationary so as to avoid breakage of the wire 40. In order to improve visibility of the marker, a suitable ultraviolet stabilized pigment may be added to the fibreglass resin during the molding process.

When this embodiment of the marker is to be used with the clamp 16 and arm assembly 24 described above, the assembly process described is modified in that prior to passing the bolts 14 through the flanged edge 12 of a first fibreglass section 4, a half section of the clamp 16 is placed with its ear 18 adjacent and outside the flanged edge 12 of that fibreglass section 4. Some of the bolts 14 are then simply passed through the flanged edge 12 of that fibreglass section 4, while some other of the bolts 14 will be passed through both the ear 18 and the flanged edge 12 of that fibreglass section 4. The wire 40 is then installed in the usual manner described previously. The other fibreglass section is then positioned adjacent the first fibreglass section 4, so that the bolts 14 pass through the flanged edges 12 of each fibreglass section 4. The bushing 36, attached to the narrow end 26 of the suspension arm assembly 24, may then be seated in the seat 21 of the clamp 16. The other half of the clamp 16 is then positioned adjacent and outside the flanged edge 12 of the second fibreglass section 4, and the nuts 14 and associated lock washers installed on each bolt 14 in the manner previously described. The bolts 23 may then also be inserted through the flange 22 of the clamp 16. The bracket 30 is then ready to be bolted through bolts 38 to the frame 37 of the four conductor spacer-damper 36.

The bracket 30 of the arm assembly 24 could of course be adapted to be attached to a spacer damper which is adapted to attach to a high voltage wire with any number of a plurality of conductors in the bundle. In addition, the bracket 30 could be adapted to clamp directly to a metalized rubber bushing affixed to the single conductor of a single conductor high voltage wire. As well, other suspension assemblies for suspending markers from high voltage wires, and which are well known, could also be used provided that provision is made for electrically connecting the aluminized fibreglass molding cloth 6 to the high voltage wire through wire 40 or otherwise.

By constructing the marker with an electrically insulating body 2, of fibreglass, and by providing an electrically conducting layer of aluminized fibreglass molding cloth 6, the combined weight of the insulating body 2 and the electrically conducting layer is kept sufficiently low so that the warning marker is supportable on the high voltage wire. By the warning marker being "supportable" as used throughout this application is meant that the warning marker is of such a weight as can be suspended from the high voltage wire without causing an undue mechanical strain on it. The wire 40 helps ensure that all of the sections of the aluminized fibreglass molding cloth 6 will be at the same electrical potential so as to create a substantially electrically continuous electrically conducting layer, by virtue of mechanical contact of the wire 40 with each of those sections. Without use of the wire 40, such uniform electrical potential may not be obtained due to fibreglass resin becoming interposed between sections of the aluminized fibreglass molding cloth 6, even between portions 8 of different sections although care may be taken to prevent this latter occurrence. The substantially electrically continuous electrically conducting layer of aluminized fibreglass molding cloth 6, ensures that there will be few points at which a high potential gradient can result providing that the insulating body 2 is continuous and substantially smooth, and provided that the electrically conducting layer of aluminized fibreglass molding cloth 6 is disposed adjacent the entire outer surface of the electrically insulating body 2. As a result, corona discharge from the high voltage wire or from the metal components of the clamp 16, suspension arm assembly 24, and the four conductor spacer-damper 36 is effectively reduced.

Various modifications to the invention are possible. For example, the electrically insulating body could be composed of a number of other suitable plastics, and could be formed in any shape which is substantially smooth and continuous. For example, a tear drop shape. As well, a number of materials could be substituted for the aluminized fibreglass molding cloth 6 to act as the substantially continuous electrically conducting layer. For example, fibreglass molding cloth which has been coated with a film of another metal compatible with fibreglass could be used, or sections of metal foil affixed to the inside of the electrically insulating body 2 could be used, or a thin layer of metal deposited on the inside or outside surface of the insulating body. However, the last two methods are not as preferred as having the electrically conducting layer disposed within the insulating body, as due to differences in expansion rates between the insulating body and such electrically conducting layers, the electrically conducting layers of such types would tend to crack over a period of time and thereby create potential corona discharge problems.

Other various modifications, and departures lying within the spirit of the invention or its scope as defined by the appended claims will be obvious to those skilled in the art.

I claim:

1. An aircraft warning marker for use on a suspended high voltage wire, comprising:
 (a) a substantially smooth, continuous electrically insulating body, having a length and width both of at least one foot;
 (b) a substantially electrically continuous electrically conducting layer disposed adjacent, and spaced inward from, substantially the entire outer surface of said electrically insulating body;
 (c) a clamp electrically connected to said electrically conducting layer so as also to enable said marker to be suspended from the high voltage wire by the clamp, with said electrically conducting layer in electrical communication with the high voltage wire;

said insulating body, said conducting layer, and said clamp, having a sufficiently low combined weight so that the warning marker is supportable on the wire.

2. An aircraft warning marker as described in claim 1, wherein said insulating body is comprised of fibreglass, and wherein said conducting layer is comprised of metalized fibreglass molding cloth disposed within the fibreglass.

3. An aircraft warning marker as described in claim 1 wherein said insulating body is comprised of two adjacent sections each having a flanged edge which is connected to the flanged edge of the other insulating body section, and wherein said conducting layer comprises a plurality of sections a portion of each of which extends between the flanged edges, and additionally comprises electrically conducting means extending between the flanged edges for electrically connecting the conducting layer sections.

4. An aircraft warning marker as described in claim 3 wherein said insulating body is comprised of fibreglass, and wherein said conducting layer is comprised of metalized fibreglass molding cloth disposed within the fibreglass.

5. An aircraft warning marker as described in claim 4 wherein said insulating body is a hollow, substantially spherical shell.

6. An aircraft warning marker as described in claim 5 wherein the shell is comprised of two substantially semi-spherical sections each having a circular, radially extending flanged edge which flanged edge is connected to the flanged edge of the other semi-spherical section, and wherein the metalized fibreglass molding cloth is comprised of a plurality of sections each having a portion extending between the flanged edges, and additionally comprising electrically conducting means extending between the flanged edges for electrically connecting the metalized fibreglass molding cloth sections.

7. An aircraft warning marker as described in claim 4 or 6 wherein the flanged edges are connected by means of bolts passing therethrough, and wherein said electrically conducting means comprises a wire a portion of which is wound on the bolts so as to assist in retaining the wire between the flanged edges.

8. An aircraft warning marker as described in claim 5 or 6, wherein the combined thickness of said insulating body and conducting layer is between 5 to 11 millimeters and wherein the diameter of said insulating body is substantially 1 to 1.5 meters.

9. An aircraft warning marker as described in claim 1 wherein said insulating body is comprised of plastic, and wherein said conducting layer is comprised of metalized cloth disposed within the plastic.

10. An aircraft warning marker as described in claim 3 wherein said insulating body is comprised of plastic, and wherein said conducting layer is comprised of metalized cloth disposed within the plastic.

* * * * *